US010776163B1

(12) United States Patent
Harris (10) Patent No.: US 10,776,163 B1
(45) Date of Patent: Sep. 15, 2020

(54) NON-HIERARCHICAL MANAGEMENT SYSTEM FOR APPLICATION PROGRAMMING INTERFACE RESOURCES

(71) Applicant: AMAZON TECHNOLOGIES, INC., Seattle, WA (US)

(72) Inventor: Daniel Morgan Harris, Grosse Pointe Farms, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 178 days.

(21) Appl. No.: 15/923,806

(22) Filed: Mar. 16, 2018

(51) Int. Cl.
*G06F 9/46* (2006.01)
*G06F 9/50* (2006.01)
*G06F 9/54* (2006.01)
*G06F 16/28* (2019.01)

(52) U.S. Cl.
CPC ............ *G06F 9/5011* (2013.01); *G06F 9/544* (2013.01); *G06F 16/285* (2019.01)

(58) Field of Classification Search
CPC ........................................................ G06F 9/52
USPC ........................................................ 718/104
See application file for complete search history.

(56) References Cited

U.S. PATENT DOCUMENTS

| | | | | |
|---|---|---|---|---|
| 7,673,031 B1* | 3/2010 | Jalagam | ............... | H04L 67/1097 709/223 |
| 8,046,477 B1* | 10/2011 | Arutla | ....................... | G06F 9/50 709/220 |
| 10,409,642 B1* | 9/2019 | Tang | ..................... | G06F 9/5005 |
| 2007/0094665 A1* | 4/2007 | Jackson | .................... | G06F 9/50 718/104 |
| 2007/0130183 A1* | 6/2007 | Morris | .................. | G06F 16/284 |
| 2008/0082982 A1* | 4/2008 | Benedetti | .............. | G06F 9/4843 718/104 |
| 2008/0216081 A1* | 9/2008 | Jackson | .............. | G06F 21/6218 718/104 |
| 2009/0276834 A1* | 11/2009 | Bloesch | .............. | G06F 21/6218 726/4 |
| 2009/0307706 A1* | 12/2009 | Jostmeyer | ............... | G06F 9/485 718/104 |
| 2011/0179419 A1* | 7/2011 | Gusev | ................... | G06F 9/5061 718/100 |
| 2012/0042256 A1* | 2/2012 | Jamjoom | .............. | G06F 9/5011 715/736 |
| 2013/0238594 A1* | 9/2013 | Hong | ................ | G06F 16/24578 707/710 |

(Continued)

*Primary Examiner* — Mehran Kamran
(74) *Attorney, Agent, or Firm* — Lindauer Law, PLLC (57) ABSTRACT

Access to Application Programming Interface (API) resources that span multiple categories is facilitated by the addition of labels to at least a subset of the resources. While the resources remain in their original hierarchical categories, the labels are useable to query, access, and manipulate resources that span multiple categories without necessitating use of complex queries or multiple API calls. A label may indicate the category to which a resource belongs. If a first resource includes a link to a second resource, a label for the second resource may indicate the category of the first resource. Labels may also be associated with resources based on specific content types and data values contained with the resource. Use of labels in such a manner enables a body of resources that spans multiple categories to be queried based on categorical relationships as well as the type of data associated with each resource.

20 Claims, 6 Drawing Sheets

(56) References Cited

U.S. PATENT DOCUMENTS

| | | | |
|---|---|---|---|
| 2013/0283340 A1* | 10/2013 | Biswas | G06F 21/44 726/1 |
| 2014/0343989 A1* | 11/2014 | Martini | H04L 63/104 705/7.17 |
| 2015/0066557 A1* | 3/2015 | Lichti | H04W 4/029 705/7.15 |
| 2015/0081912 A1* | 3/2015 | Tan | H04L 67/1038 709/226 |
| 2015/0146670 A1* | 5/2015 | Liu | H04W 72/04 370/329 |
| 2015/0149642 A1* | 5/2015 | Cormie | H04L 47/783 709/226 |
| 2015/0161147 A1* | 6/2015 | Zhao | G06F 16/7837 707/772 |
| 2015/0286505 A1* | 10/2015 | Liu | G06F 9/5011 718/104 |
| 2017/0034152 A1* | 2/2017 | Subramanya | H04L 63/0815 |
| 2017/0339694 A1* | 11/2017 | Yu | H04W 72/04 |
| 2018/0039526 A1* | 2/2018 | Mulla | H04L 41/5019 |
| 2018/0075048 A1* | 3/2018 | Vimberg | G06F 16/88 |
| 2018/0129716 A1* | 5/2018 | Su | G06F 16/9024 |
| 2018/0192406 A1* | 7/2018 | Tang | H04W 72/1263 |
| 2018/0219867 A1* | 8/2018 | Patterson | H04L 63/102 |
| 2018/0246929 A1* | 8/2018 | Kreutzer | G06F 16/2453 |
| 2018/0367425 A1* | 12/2018 | Zhang | H04L 43/08 |
| 2019/0212881 A1* | 7/2019 | Rommel | G06F 16/904 |

\* cited by examiner

NON-HIERARCHICAL MANAGEMENT SYSTEM FOR APPLICATION PROGRAMMING INTERFACE RESOURCES

BACKGROUND

Resources for use with Application Programming Interfaces (APIs) are typically stored in a hierarchical data structure based on the functional domains associated with each resource, which may hinder the ability to efficiently access or use multiple resources across a large number of domains.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Application Programming Interfaces (APIs) may operate within a stateless Representational State Transfer (REST) architecture in which various resources are accessed and manipulated using various commands. For example, a resource may include a data object having a type (e.g., a category or domain) and associated data. In some cases, a category or domain may include a collection of a homogeneous type of resources. The data associated with a resource may include various types of data models, such as a JavaScript Object Notation (JSON) model, and may include various types of data, such as alphanumeric data (e.g., scalars), arrays, objects, and so forth. A resource may also include relationships to other resources, such as a parent or child relationship (e.g., a "contained in" relationship), which may include a resource being associated with a sub-category within a category. Relationships to other resources may also include links or other types of references to other resources. For example, a first resource may include a Hypermedia as the Engine of Application State (HATEOAS) link that indicates a second resource associated with a different category. A resource may additionally include a set of methods that may be used to operate on the resource. For example, methods may include Hypertext Transfer Protocol (HTTP) methods for interacting with data, such as "get", "post", "put", "patch", and "delete" methods.

The organization of resources within a hierarchical set of categories and sub-categories may enable resources to be logically developed and located by developers, but may hinder the performance of tasks that access resources associated with multiple categories. For example, if a particular resource in a first category is referenced by a resource in a second category and another resource in a third category, the particular resource may not be readily included in a single sub-category since two disparate categories of resources reference the particular resource. While the particular resource may be included in a category of its own, this approach is not scalable if a large number of resources that are referenced by multiple categories and different combinations of categories exist. For example, the inclusion of each resource in a category that includes only a single resource or a small number of resources would be impractical from the standpoint of a developer and would create difficulties when attempting to locate particular resources. Additionally, the generation of queries to locate, access, modify, or utilize particular resources may become complex, error-prone, or ineffective if the path associated with each resource is not readily known.

Described in this disclosure are techniques for the organization, access, and modification of API resources that include use of hierarchical categories to organize the resources in a manner that corresponds to the type or domain associated with the resources, and use of labels (e.g., tags, flags, or other types of data or metadata) to indicate resources that correspond to tasks that span multiple categories. For example, a plurality of resources may be divided into multiple categories, each category corresponding to a type or domain associated with the resources contained in the category. Each category may include one or more sub-categories. For example, categories may include collections of resources, while sub-categories may include sub-collections of resources having a "contained in" relationship with the categories. The categories and sub-categories, themselves, may also function as resources. Continuing the example, a plurality of resources may include at least a first resource associated with a first category, a second resource associated with a second category, and a third resource associated with a third category.

Each resource may have a label associated therewith indicative of the category within which the resource is contained. For example, the first resource may have a first label indicative of the first category associated therewith, and the second resource may have a second label indicative of the second category associated therewith. In other implementations, certain categories may not include a label associated therewith. For example, label data indicative of rules by which labels are associated with resources may indicate that a label is to be associated with resources having a "contained in" relationship with a first category, but may not indicate that a label is to be associated with resources associated with a second category. In some cases, one or more resources may reference another resource associated with a different category. For example, the first resource may include a reference, such as a HATEOAS link or another type of link, that indicates the third resource. Each resource that is referenced by another resource associated with a different category may have the label indicative of that category associated therewith. Continuing the example, if the first resource includes a link that references the third resource, the first label may also be associated with the third resource. If the second resource includes a link that references the third resource, the second label may also be associated with the third resource. In other implementations, the label data may indicate particular categories for which a label is to be applied to a linked resource, while other linked resources may not have a label associated therewith. For example, based on the rules indicated by the label data resources linked to from a resource in a first category may have a label associated therewith while resources linked to from a resource in a second category may not have a label associated therewith. A particular resource may be associated with any number of labels, depending on the categories and sub-categories within which the particular resource is contained and the other resources that include references to the particular resource.

In some cases, a resource may also have a label associated therewith indicative of a content type. The content type may indicate the type(s) of data include within a resource. For example, the content type may indicate whether a resource includes a numerical value, an alphanumeric string, a Boolean value, a null value, an array, a particular data value, and so forth. As another example, the content type may indicate whether a resource includes a particular field or other type of schema for containing data. Continuing the example, a particular resource may include a field indicating that the resource corresponds to a purchase transaction between two businesses, which may differentiate the particular resource from other resources associated with purchase transactions that include non-businesses. As a result, a task associated with business-to-business transactions may utilize the particular resource, as well as other resources in other categories that include similar fields. Based on one or more type of contents included in a resource, one or more additional labels may be associated with the resource. For example, if the third resource, referenced in the example above, includes a particular content type, such as a field associated with business-to-business transactions, a third label indicative of this content type may be associated with the third resource.

The application of labels to resources may enable the resources to be efficiently queried, located, accessed, and manipulated without requiring significant filtering or processing by a client device providing the query or by the server or other type of computing device storing the resources. For example, a query received from a client device may indicate the first label associated with the first category and the third label associated with the content type. Based on correspondence between the query and the third resource, access to the third resource may be provided to the client device. In some implementations, the labels associated with a resource may be determined independently of a query, such as prior to receipt of the query from the client device. In other implementations, the labels associated with a resource may be determined in response to a query (e.g., on-the-fly) to determine whether a resource is applicable to a query. In some implementations, certain labels may be prioritized over other labels. For example, resources associated with a first label may be returned in a response prior to resources associated with a second label, or a response to a query that includes a first label may be generated prior to a response to a query that includes a second label.

As one skilled in the art will appreciate in light of this disclosure, certain embodiments may be capable of achieving certain advantages, including some or all of the following. The ability to query resources based on one or more labels may enable each resource useful to a task that spans multiple categories to be located without requiring use of a complex query or multiple API calls, thus reducing the bandwidth and other computing resources used to access and manipulate resources. Additionally, use of labels associated with resources may enable authorization for access to resources to be controlled without requiring separate security measures to be performed by the client device or the server storing the resources. For example, a client device may be automatically authorized to access resources associated with particular labels, while resources containing labels for which the client device is not authorized to access may be removed from responses to queries by the client device. Further, the labels associated with particular resources may be used to precompute additional responses to be provided to a client device. For example, subsequent to receiving a query from the client device indicating the first and third labels or determining session data from the client device that indicates the labels, other resources associated with the first and third labels may be determined. A response indicative of these resources may be precomputed and provided to the client device in response to a subsequent query. In some implementations, an additional resource, category, or task may be generated that indicates or references at least a subset of the resources that share a particular label or combination of labels. For example, a new resource that includes links or other types of references to each resource that includes both the first label and the third label may be generated and used in response to queries or tasks that reference the first and third labels.

Figure 1:
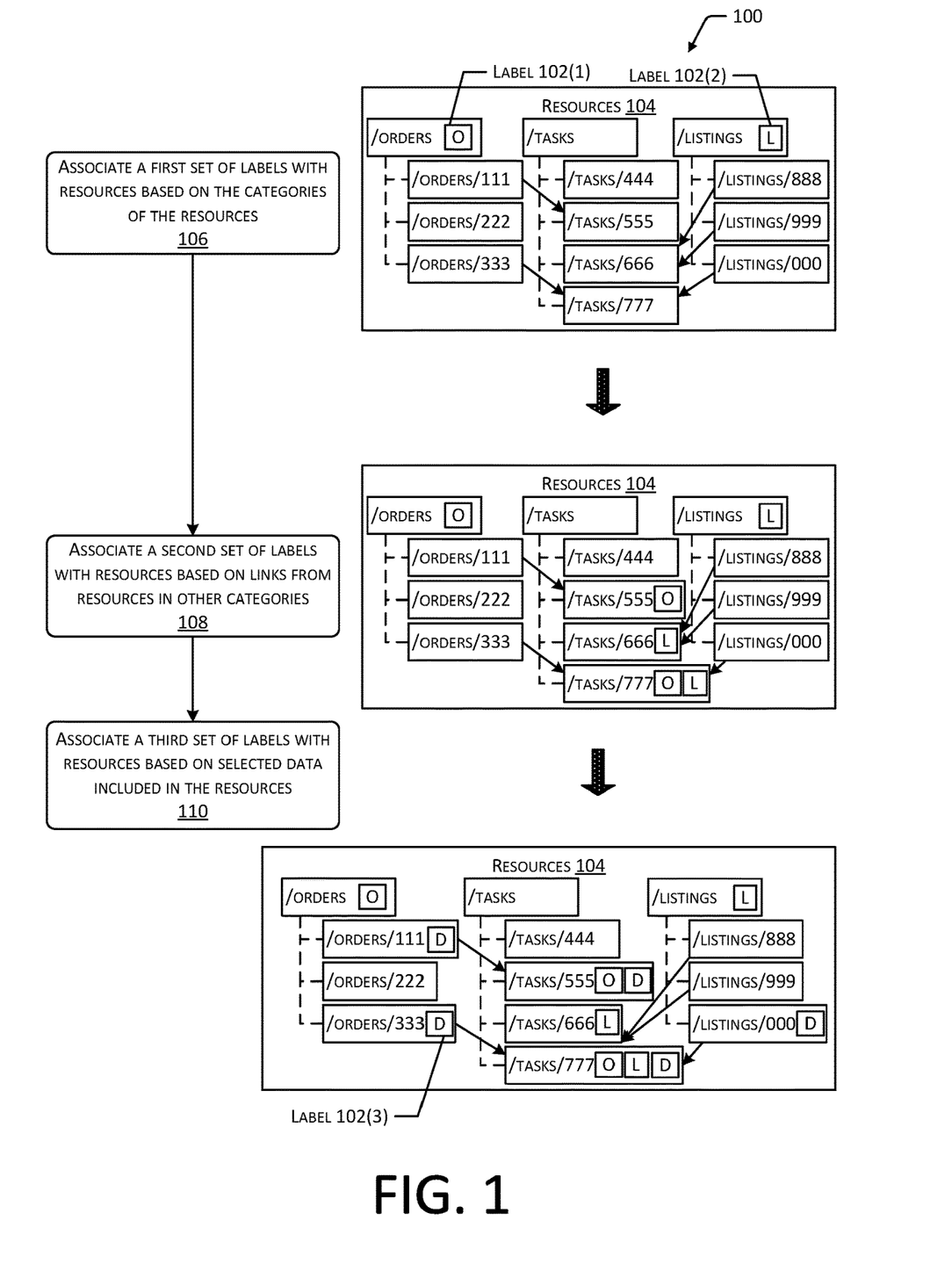
FIG. 1 depicts a scenario illustrating a method for associating labels with resources based on the characteristics of the resources, such as the categorical structure within which the resources are stored and the data contained within each resource.

FIG. 1 depicts a scenario 100 illustrating a method for associating labels 102 with resources 104 based on the characteristics of the resources 104, such as the categorical structure within which the resources 104 are stored and the data contained within each resource 104. As discussed previously, in some implementations, resources 104 may include data objects associated with one or more APIs. For example, resources 104 may include data objects used in conjunction with one or more APIs to facilitate purchase transactions associated with an online marketplace. Continuing the example, the resources 104 may be associated with viewing information for items available for purchase, initiating purchase transactions to generate orders for the items, and various associated tasks, such as determination of shipping costs, taxes, item availability, payment methods and validation, information regarding purchasers and sellers, and so forth. Specifically, FIG. 1 depicts a plurality of example resources 104 divided into three categories, termed "orders", "tasks", and "listings". While the "orders" category is depicted including three example resources 104, the "tasks" category is depicted including four example resources 104, and the "listings" category is depicted including three example resources 104, any number of resources may be included within a category. Additionally, in some implementations, the categories, themselves, within which one or more other resources 104 are contained, may also function as resources 104. While FIG. 1 depicts three example categories, in other implementations, any number of categories may be included in the resources 104. Additionally, in some implementations, one or more of the categories may include one or more sub-categories.

In some cases, one or more of the resources 104 may reference one or more other resources 104. For example, a resource 104 may include a HATEOAS link or another type of reference that indicates another resource 104. Continuing the example, FIG. 1 depicts the resource 104 "/orders/111" including a reference to the resource 104 "/tasks/555", the resources 104 "/orders/333" and "/listings/000" each including a reference to the resource 104 "/tasks/777", and the resources 104 "/listings/888" and "/listings/999" each including a reference to the resource 104 "/tasks/666". A single resource 104 may include links or other types of references to one or multiple other resources 104, and a resource 104 may be linked to from one or multiple other resources 104. In some implementations, one or more resources 104 may consist essentially of links to other resources 104. For example, a resource 104 may include a collection of links to other resources 104 associated with a particular type of data or other characteristic.

In some cases, a particular service may use resources 104 associated with multiple categories. For example, to complete a purchase transaction between two businesses, the resources 104 "/orders/111", "/orders/333", "/tasks/555", "/tasks/777", and "/listings/000" may each be used. In such a case, it may be useful to efficiently query and access each of these resources 104, however, to access multiple resources 104 spanning multiple categories, multiple API calls may be necessary. However, by associating labels 102 with selected resources 104, the particular resources 104 associated with various types of data may be queried at a subsequent time.

For example, at 106, a first set of labels 102 may be associated with resources 104 based on the categories of the resources 104. Continuing the example, the parent resource 104 of the "/orders" category may have a first label 102(1) associated therewith, such that each resource within the "/orders" category is associated with the first label 102(1). Similarly, the parent resource 104 of the "/listings" category may have a second label 102(2) associated therewith, such that each resource within the "/listings" category is associated with the second label 102(2). In some implementations, labels 102 may be associated with only a subset of the categories of resources 104. For example, FIG. 1 does not depict a label 102 associated with the parent resource 104 of the "/tasks" category.

Because certain resources 104 may reference other resources 104 associated with other categories, such as through use of a HATEOAS link, associating a label 102 with a category of resources 104 may not necessarily indicate every resource 104 that pertains to a particular service. Therefore, at 108, a second set of labels 102 may be associated with resources 104 based on links from resources 104 in other categories. For example, due to the reference to the "/tasks/555" resource 104 within the "/orders/111" resource 104 and the reference to the "/tasks/777" resource within the "/orders/333" resource 104, the first label 102(1) may be associated with the "/tasks/555" and "/tasks/777" resources 104. Similarly, due to the reference to the "/tasks/666" resource 104 within the "/listings/888" and "/listings/999" resources 104 and the reference to the "/tasks/777" resource 104 within the "/listings/000" resource 104, the second label 102(2) may be associated with the "/tasks/666" and "/tasks/777" resources 104. In other implementations, a resource 104 that is referenced by another resource 104 may not receive a label 102 based on this reference. For example, resources 104 linked to from other resources 104 in a first category may receive a label 102 while resources 104 linked to from other resources 104 in a second category may not receive a label 102.

In some cases, the applicability of a particular resource 104 to a certain function may depend on the data contained within the resource 104. For example, resources 104 that include a field associated with business-to-business transactions may be associated with functions performed by a business-to-business service. As another example, resources 104 that include a particular value indicative of business-to-business transactions within a generic field, such as a field associated with customer type indicating the value "business", may be associated with functions performed by a business-to-business service. However, in some cases, such resources 104 may span multiple categories. Therefore, at 110, a third set of labels 102 may be associated with a subset of the resources 104 based on selected data included in the resources 104. For example, each of the resources 104 may be analyzed to determine the presence of a particular type of content or a particular value. A third label 102(3) may be associated with the resources 104 determined to include the particular value or type of content. Continuing the example, FIG. 1 depicts the third label 102(3) associated with the "/orders/111", "/orders/333", "/tasks/555", "/tasks/777", and "/listings/000" resources 104.

The labels 102 associated with various resources 104 may be used to query, access, and manipulate the resources 104 at a subsequent time. For example, a query to locate each resource 104 associated with business-to-business transactions may indicate the third label 102(3). A response to the query may indicate the "/orders/111", "/orders/333", "/tasks/555", "/tasks/777", and "/listings/000" resources 104 (e.g., each resource 104 that includes the third label 102(3)). As another example, a query may attempt to locate each resource 104 that is associated with the "/orders" category that is related to business-to-business transactions. As such, the query may indicate the first label 102(1) and the third label 102(3). A response to the query may indicate the "/orders/111", "/orders/333/", "/tasks'555", and "/tasks/777" resources 104 (e.g., each resource that includes both the first label 102(1) and the third label 102(3)). As discussed previously, labels 102 may also be used to automatically determine authorization to access certain resources 104, to precompute subsequent responses, and so forth.

Figure 2:
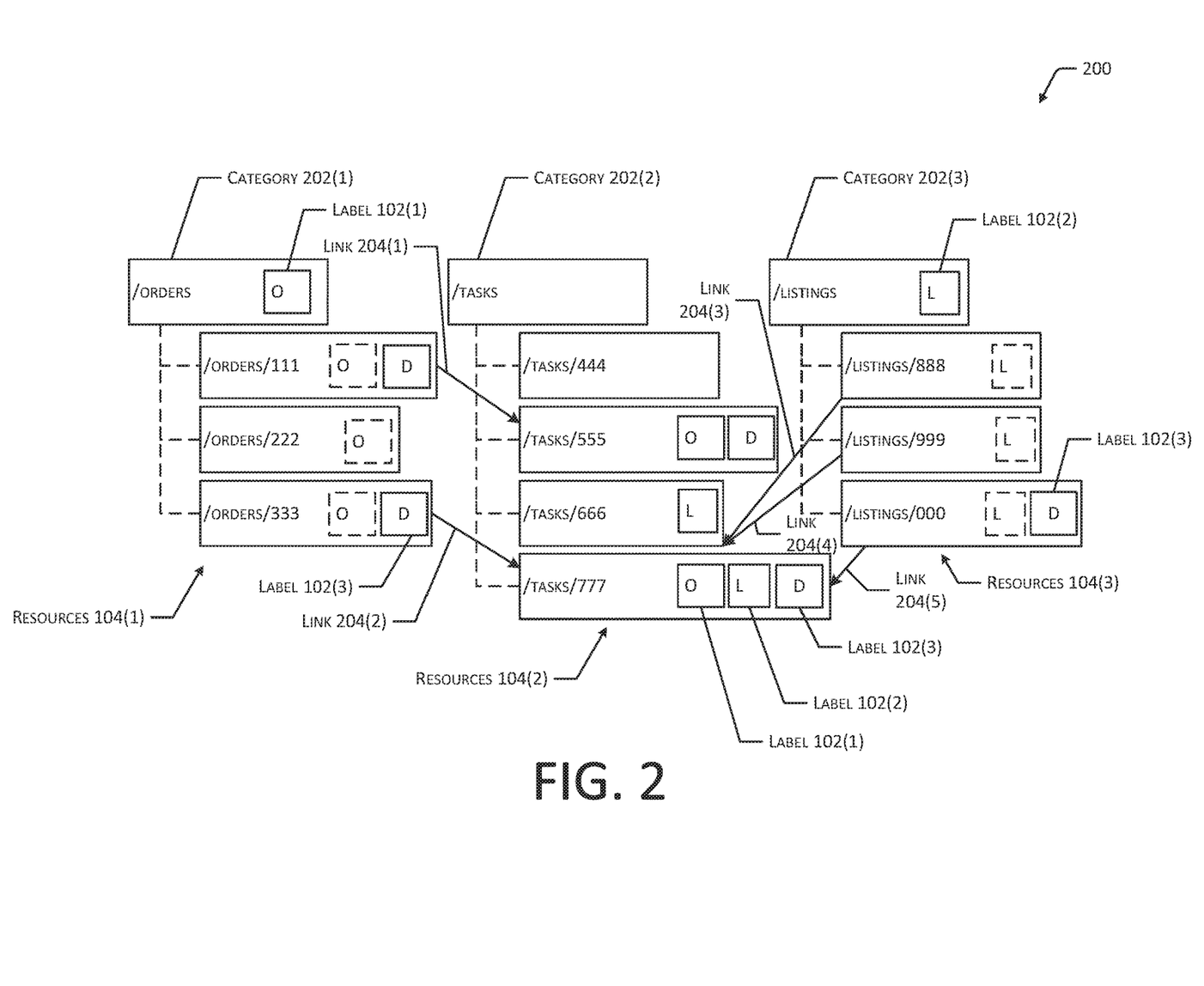
FIG. 2 is a block diagram illustrating example relationships between resources and labels indicative of the relationships.

FIG. 2 is a block diagram 200 illustrating example relationships between resources 104 and labels 102 indicative of the relationships. Specifically, FIG. 2 depicts an example plurality of resources 104 that includes a first set of resources 104(1) associated with a first category 202(1), a second set of resources 104(2) associated with a second category 202(2), and a third set of resources 104(3) associated with a third category 202(3). As described with regard to FIG. 1, the example resources 104 may be associated with providing information regarding items available for purchase and completing purchase transactions relating to the items. For example, the first category 202(1) (e.g., "/orders"), may include resources 104(1) that are associated with generating, tracking, and completing purchase transactions. The second category 202(2) (e.g., "/tasks") may include resources 104 to perform tasks for facilitating purchase transactions, such as calculating shipping costs, taxes, determining information regarding users, and so forth. The third category 202(3) (e.g., "/listings") may include resources 104 for providing information regarding items and receiving modifications to such information. The first category 202(1) is shown including three resources 104(1), however in some cases, the parent resource 104(1) itself (e.g., "/orders") may also function as a resource 104(1). The second category 202(2) is shown including four resources 104(2), and the third category 202(3) is shown including three resources 104(3). However, a system may include any number of resources 104 contained within any number of categories 202 and sub-categories.

In some cases, a particular resource 104 may include a reference to one or more other resources 104. For example, a resource 104 may include a HATEOAS link, another type of link, or another type of reference to another resource 104. Continuing the example, FIG. 2 depicts a first resource 104(1) ("/orders/111") associated with the first category 202(1) including a link 204(1) to a second resource 104(2) ("/tasks/555") associated with the second category 202(2). FIG. 2 also depicts a resource 104(1) ("/orders/333") associated with the first category 202(1) including a link 204(2) to a resource 104(2) ("/tasks/777") associated with the second category 202(2). FIG. 2 further depicts a resource 104(3) ("/listings/888") associated with the third category 202(3) including a link 204(3) to a resource 104(2) ("/tasks/666") associated with the second category 202(2). FIG. 2 additionally depicts a resource 104(3) ("/listings/999") associated with the third category 202(3) including a link 204(4) to a resource 104(2) ("/tasks/666") associated with the second category 202(2). FIG. 2 further depicts a resource 104(3) ("/listings/000") associated with the third category 202(3) including a link 204(5) to a resource 104(2) ("/tasks/777") associated with the second category 202(2). A resource 104 may include any number of links 204 to any number of other resources 104, including zero links 204, a single link 204, or multiple links 204. Additionally, a resource 104 may be linked to from any number of other resources 104, including zero resources 104, a single resource 104, or multiple other resources 104. For example, in some cases, a resource 104 may consist essentially of links 204 to other resources 104, while in other cases, a resource 104 may include zero links 204 to other resources 104.

As described with regard to FIG. 1, one or more labels 102 may be associated with various resources 104 based on the characteristics of the resources 104. For example, a first label 102(1) may be associated with the first category 202(1), such that each resource 104(1) within the first category 202(1) is associated with the first label 102(1) due to the parent-child relationship between the first set of resources 104(1) and the parent resource 104(1) of the first category 202(1). Similarly, a second label 102(2) indicative of the third category 202(3) may be associated with the parent resource 104(3) of the third category 202(3), such that each resource 104(3) having a child relationship with the parent resource 104(3) is associated with the second label 102(2). In some cases, a category 202 may not necessarily be associated with a label 102. For example, FIG. 2 does not depict a label 102 associated with the second category 202(2). In other cases, a category 202 may be associated with multiple labels 102, or particular sub-categories within a category 202 may be associated with different labels 102. While FIG. 2 depicts the first label 102(1) and the second label 102(2) associated with entire categories 202 of resources 104, in other implementations, a label 102 may be associated with only a subset of resources 104 within a category 202, such as each resource 104 within a particular category 202 that also includes another characteristic, such as a selected value or field.

Because certain resources 104 may include links 204 to other resources 104, the resources 104 that are referenced via a link 204 may be associated with the category 202 of the resource 104 that includes the link 204. For example, a task that utilizes the "/orders/111" resource 104(1), which includes a link 204(1) to the "/tasks/555" resource 104(2) would also utilize the "/tasks/555" resource 104(2) due to the link 204(1). As such, in some implementations, a resource 104 that is referenced by a link 204 from another resource 104 may be associated with the label 102 that corresponds to the category 202 of the linking resource 104. For example, FIG. 2 depicts the "/tasks/555" resource 104 (2) including the first label 102(1) due to the link 204(1) from a resource 104(1) associated with the first category 202(1) and the "/tasks/777" resource 104(2) including the first label 102(1) due to the link 204(2) from a resource 104(1) associated with the first category 202(1). Similarly, FIG. 2 depicts the "/tasks/666" resource 104(2) including the second label 102(2) due to the link 204(5) and the link 204(4) from resources 104(3) associated with the third category 202(3) and the "/tasks/777" resource 104(2) including the second label 102(2) due to the link 204(3) from a resource 104(3) associated with the third category 202(3). In other implementations, a link 204 from a resource 104 in one category 202 may result in application of a label 102 to the linked resource 104, while a link 204 from a resource 104 in a different category 202 may not result in application of a label 102 to the linked resource 104.

In some implementations, one or more resources 104 may include a particular field, value, or other type of data, independent of the category 202 associated with the resource(s) 104. For example, resources 104 that include a field associated with business-to-business transactions may be used to complete a purchase transaction between businesses. In such a case, based on a determination that a resource 104 includes a selected type of data, field, or value, a third label 102(3) indicative of the content of the resource 104 may be associated with the resource 104. For example, FIG. 2 depicts two resources 104(1) within the first category 202(1), two resources 104(2) within the second category 202(2), and one resource 104(3) within the third category 202(3) that include the third label 102(3). In some implementations, the third label 102(3) may be associated with a resource 104 based on the content or content type of the resource 104 itself. In other implementations, the third label 102(3) may be associated with a resource 104 that is linked to from another resource 104 associated with the third label 102(3). In still other implementations, the third label 102(3) may be associated with a resource 104 that includes a link 204 to another resource 104 associated with the third label 102(3). In yet other implementations, the third label 102(3) may be associated with a resource 104 that is a child of a parent resource 104 associated with the third label 102(3).

Figure 3:
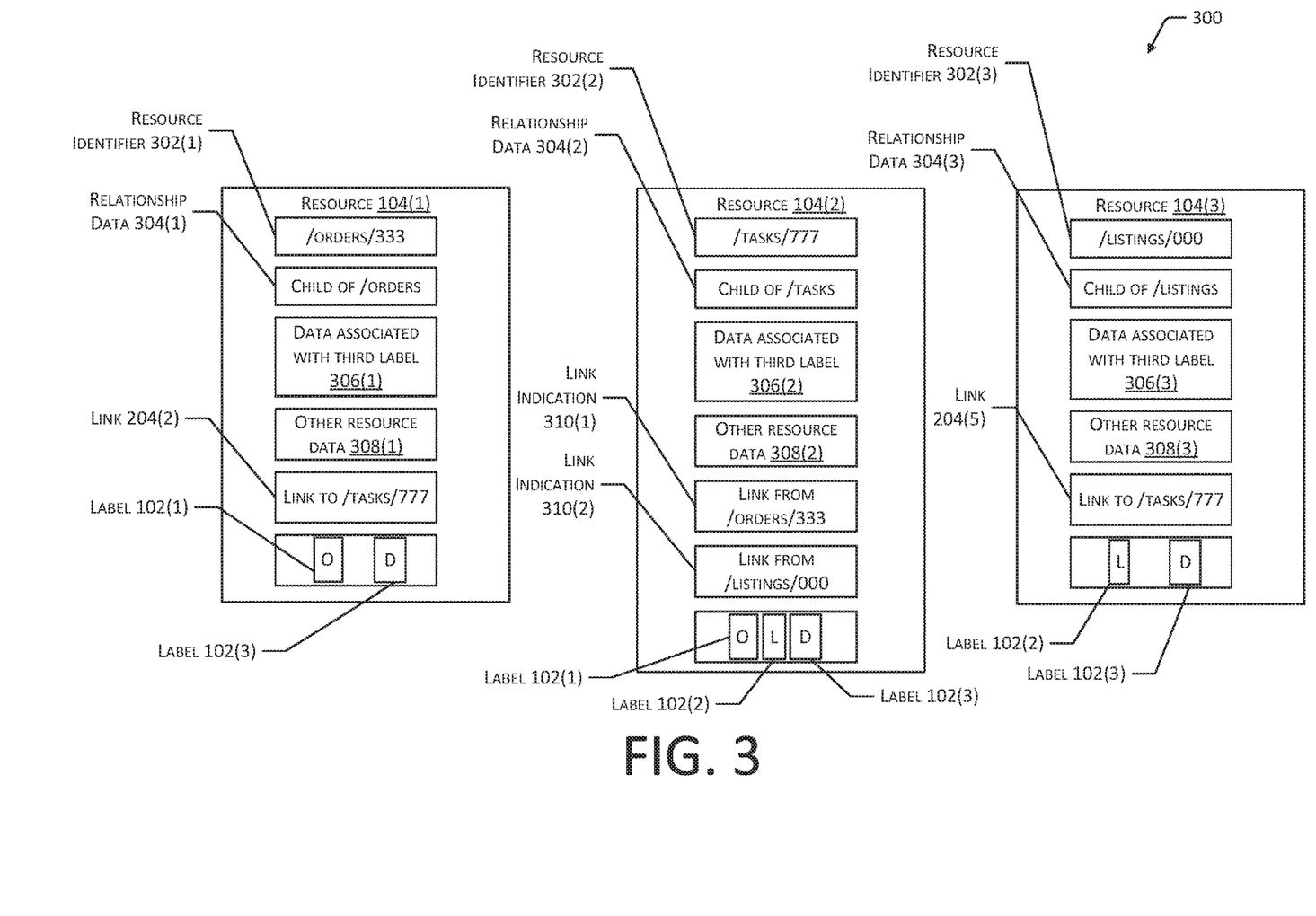
FIG. 3 is a block diagram illustrating example components of resources that may be used to associate labels therewith.

FIG. 3 is a block diagram 300 illustrating example components of resources 104 that may be used to associate labels 102 therewith. Specifically, FIG. 3 depicts three example resources 104, namely, a first resource 104(1) termed "/orders/333", a second resource 104(2) termed "/tasks/777", and a third resource 104(3) termed "/listings/000". Each resource 104 may include various types of data, such as alphanumeric data, arrays, objects, and so forth, that may be used in conjunction with an API to perform various tasks. A resource 104 may include a resource identifier 302. A resource identifier 302 may include an alphanumeric string, a path, or another type of data that may be used to differentiate a particular resource 104 from other resources 104. For example, the first resource 104(1) is shown including a first resource identifier 302(1) indicating the path "/orders/333", the second resource 104(2) is shown including a second resource identifier 302(2) indicating the path "/tasks/777", and the third resource 104(3) is shown including a third resource identifier 302(3) indicating the path "/listings/000". In some implementations, a resource identifier 302 may include data that may be processed and differentiated by a computing device that is not necessarily understandable to a human user.

A resource 104 may also include relationship data 304 indicative of the relationships between a particular resource 104 and one or more other resources 104. For example, relationship data 304 may indicate a parent or child relationship, a sibling relationship, or a more distant relationship between a particular resource 104 and one or more other resources 104. In some implementations, the relationship data 304 for a particular resource 104 may also indicate the existence of one or more links 204 or other references that indicate other resources 104, or one or more other resources 104 having links 204 or references to the particular resource 104. For example, the first resource 104(1) is shown including relationship data 304(1) indicating that the first resource 104(1) is a child of the parent resource 104 "/orders". The second resource 104(2) is shown including relationship data 304(2) indicating that the second resource 104(2) is a child of the parent resource 104 "/tasks". The third resource 104(3) is shown including relationship data 304(3) indicating that the third resource 104(3) is a child of the parent resource 104 "/listings".

Resources 104 may also include resource data that may be used to perform various functions associated with APIs. As discussed previously, resource data may include one or more of scalars, strings, Boolean values, null values, alphanumeric data, arrays, objects, and so forth. Resource data may also include fields or other schema that may be used to contain values. In some implementations, resource data may include one or more of audio data, image data, video data, haptic data, or olfactory data. As described with regard to FIGS. 1 and 2, in some implementations, a label 102 may be associated with a resource 104 based on particular resource data included in the resource 104. For example, FIG. 3 depicts the first resource 104(1) including first data associated with the third label 306(1), the second resource 104(2) including second data associated with the third label 306(2), and the third resource 104(3) including third data associated with the third label 306(3). The data associated with the third label 306 for each resource 104 may include data values, such as an indication of "business" within a "customer type" field. As another example, the data associated with the third label 306 for each resource 104 may include the same data schema independent of the value for each resource 104, such as a field associated with business to business transactions. In response to determining that a resource 104 includes data associated with the third label 306, the third label 102(3), shown in FIGS. 1 and 2, may be associated with the resource(s) 104. Each resource 104 may also include other resource data 308 independent of one or more labels 102. For example, FIG. 3 depicts the first resource 104(1) including first other resource data 308(1), the second resource 104(2) including second other resource data 308(2), and the third resource 104(3) including third other resource data 308(3). The other resource data 308 for each resource 104 may include data associated with the category 202 for each resource 104. For example, the first other resource data 308(1) may be used to perform functions associated with the first category 202(1), the second other resource data 308(2) may be used to perform functions associated with the second category 202(2), and the third other resource data 308(3) may be used to perform functions associated with the third category 202(3).

As discussed previously, a resource 104 may include one or more links 204 or other types of references that indicate one or more other resources 104. For example, the first resource 104(1) ("/orders/333") is shown including a link 204(2) that references the second resource 104(2) ("/tasks/777"). The third resource 104(3) ("/listings/000) is also shown including a link 204(5) that references the second resource 104(2) ("/tasks/777"). In some implementations, a resource 104 that is referenced by one or more other resources 104 may include one or more link indications 310. For example, the second resource 104(2) is shown including a first link indication 310(1) indicative of the link 204(2) from the first resource 104(1) and a second link indication 310(2) indicative of the link 204(5) from the third resource 104(3). The presence of links 204 or link indications 310 may be used to determine the labels 102 that are associated with one or more of the resources 104. For example, the presence of a link 204 from a particular resource 104 to another resource 104 may cause the labels 102 of the particular resource 104 to be applied to the other resource 104. As another example, the presence of a link indication 310 in a particular resource 104 may cause the links 204 of the particular resource 104 to be applied to other resources 104 that link to the particular resource 104.

Each resource 104 may also include an indication of one or more labels 102 associated therewith. For example, the first resource 104(1) is shown including the first label 102(1) indicative of the first category 202(1), indicated by the relationship data 304(1). The first resource 104(1) is also shown including the third label 102(3), indicative of the data associated with the third label 306(1) included in the first resource 104(1). The second resource 104(2) is shown including the first label 102(1) due to the link 204(2) from the first resource 104(1) associated with the first category 202(1) to the second resource 104(2). The second resource 104(2) is shown including the second label 102(2) due to the link 204(5) from the third resource 104(3) associated with the third category 202(3) to the second resource 104(2). The second resource 104(2) is also shown including the third label 102(3) due to the data associated with the third label 306(2) included in the second resource 104(2). The third resource 104(3) is shown including the second label 102(2) indicative of the third category 202(3) indicated by the third relationship data 304(3). The third resource 104(3) is also shown including the third label 102(3) due to the data associated with the third label 306(3) included in the third resource 104(3). In other implementations the third label 102(3) may be associated with one or more resources 104 due to a link 204 between a resource 104 and another resource 104 associated with the third label 102(3), a parent-child relationship between a resource 104 and another resource 104 associated with the third label 102(3), or another type of relationship between a resource 104 and another resource 104 associated with the third label 102(3).

In some implementations, one or more portions of a resource 104 may include data that is computable but not necessarily stored. For example, the fact that a resource 104 is linked to another resource 104 may be determined in response to a query, but the link indications 310 indicative of such links 204 may not necessarily be stored in a fixed manner. As another example, certain labels 102 may be determined in response to a query rather than determined in advance of a query and stored in association with a resource 104. Use of labels 102 that are determined in response to a query rather than precomputed in advance of a query may enable labels 102 to be added to an existing system without modifying the existing data schema of the system.

Figure 4:
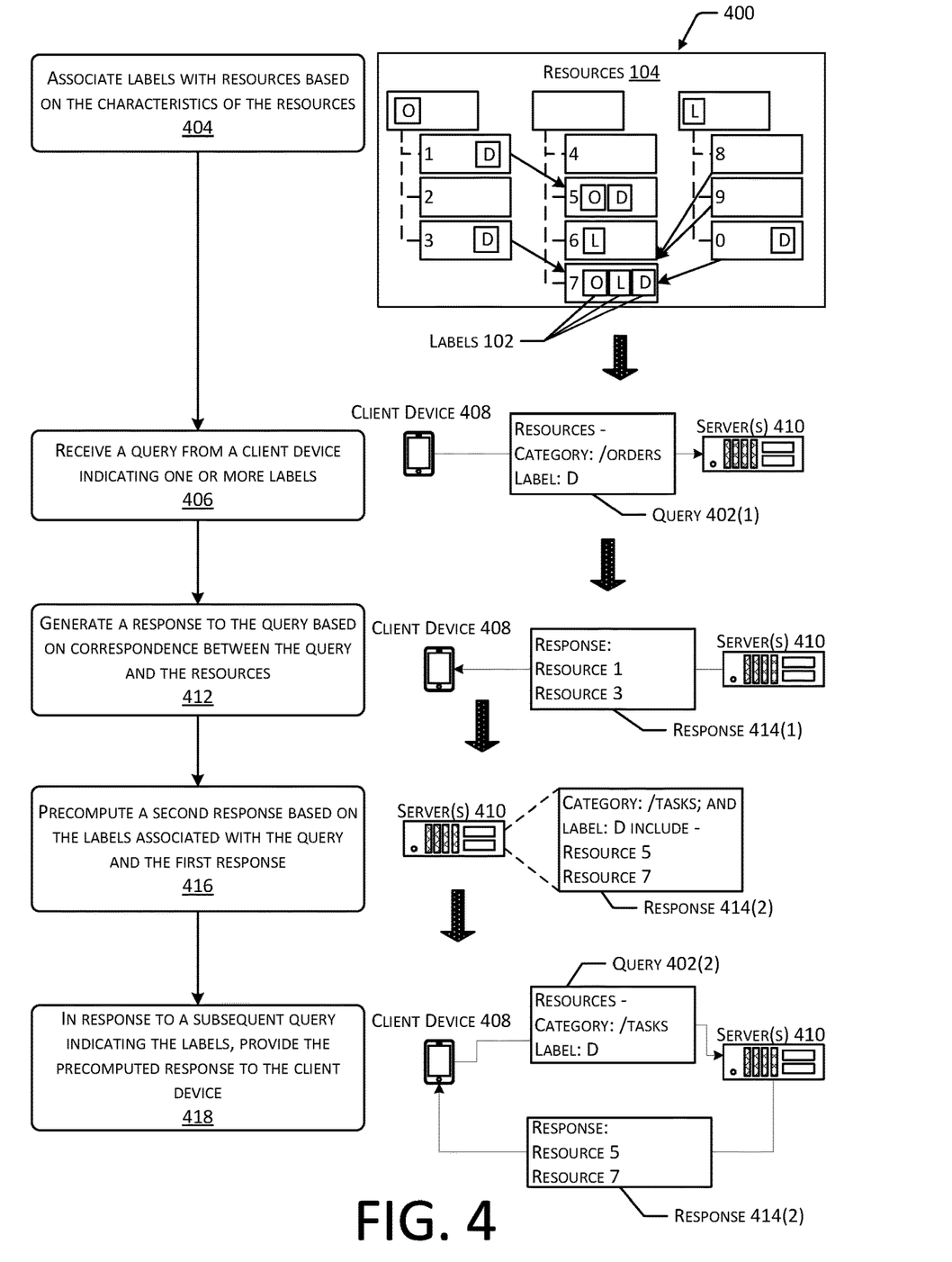
FIG. 4 depicts a scenario illustrating a method for determining responses to queries for resources based in part on the labels associated with the resources.

FIG. 4 depicts a scenario 400 illustrating a method for determining resources 104 responsive to queries 402 based in part on the labels 102 associated with the resources 104. At 404, labels 102 may be associated with resources 104 based on the characteristics of the resources 104. For example, a label 102 for a resource 104 may be indicative of a category 202 associated with the resource 104, a category 202 associated with another resource 104 containing a link 204 to the resource 104, or particular data or types of data contained in the resource 104. Example processes by which labels 102 may be associated with resources 104 are described with regard to FIGS. 1-3.

At 406, a query 402(1) from a client device 408 may be received. The query 402(1) may indicate one or more labels 102. In some implementations, a query 402(1) may also indicate particular categories 202, data types, data values such as scalars or alphanumeric strings, and so forth. FIG. 4 depicts an example query 402(1) that requests resources 104 associated with a particular category 202 (e.g., "/orders") that also include a label 102 (e.g., "D"). One or more servers 410 or another type of computing device that stores the resources 104, or is in communication with a computing device storing the resources 104, may receive and process the query 402(1). While FIG. 2 depicts the client device 408 as a portable computing device and the computing device storing the resources 104 as a server 410, in other implementations, the client device 408 and server 410 may include any number and any type of computing devices, including, without limitation, mobile devices, set-top boxes, tablet computers, personal computers, wearable computers, servers, and so forth.

In some implementations, the query 402(1) may be accompanied by session data, or session data associated with the client device 408 may be determined prior to, subsequent to, or concurrent with receipt of the query 402(1). Session data may include an identifier associated with the client device 408 and information regarding the current session executing on the client device 408. For example, session data may store data indicative of the client device 408, a user of the client device 408, a user account, or other such information in association with a session identifier. The session data may be used to persist state information between requests for web pages or other types of interfaces. In some implementations, one or more of the session data or the labels 102 indicated in the query 402(1) may be used to determine whether the client device 408 is authorized to access one or more of the resources 104. For example, a client device 408 may be authorized to access resources 104 having a particular label 102, but prevented from access to resources 104 having another label 102.

At 412, a response 414(1) to the query 402(1) may be generated based on correspondence between the query 402(1) and the resources 104. For example, the query 402(1) may indicate resources 104 associated with the "/orders" category 202 that include the label 102 "D". The response 414(1) may include data indicative of the resources 104 that correspond to the criteria indicated in the query 402(1). Continuing the example, FIG. 4 depicts two resources 104, labeled "1" and "3" having the label 102 "D" that are associated with the "/orders" category 202. Therefore, the example response 414(1) may indicate "Resource 1" and "Resource 3".

In some implementations, the labels 102 associated with a query 402(1), session data, or a client device 408 may be used to precompute additional responses 414(2). For example, at 416, a second response 414(2) based on the labels 102 associated with the query 402(1) and the first response 414(1) may be precomputed. Continuing the example, the server(s) 410 or another computing device in communication therewith may determine at least a subset of the resources 104 that include the label 102 "D" that are associated with one or more other categories 202. FIG. 4 depicts an example a second response 414(2) indicative of the resources 104 associated with the "/tasks" category 202 having the label 102 "D", namely, the resources 104 labeled "5" and "7". Precomputation of the second response 414(2) may enable the response 414(2) to be provided to the client device 408 immediately subsequent to receipt of a query 402 that indicates the associated criteria without requiring generation of the response 414(2) at that time.

Thus, at 418, in response to a subsequent query 402(2) indicating the labels 102, the precomputed response 414(2) may be provided to the client device 408. Continuing the example, the subsequent query 402(2) may indicate the "/tasks" category 202 and the label 102 "D", responsive to which the response 414(2) indicating the resources "5" and "7" may be provided without generating the response 414(2) subsequent to receiving the query 402(2). Use of a common label 102 associated with multiple categories 202 may enable a user generating queries 402 to use the same syntax, such as language indicative of the particular label 102, to reference resources 104 that span multiple categories 202.

Figure 5:
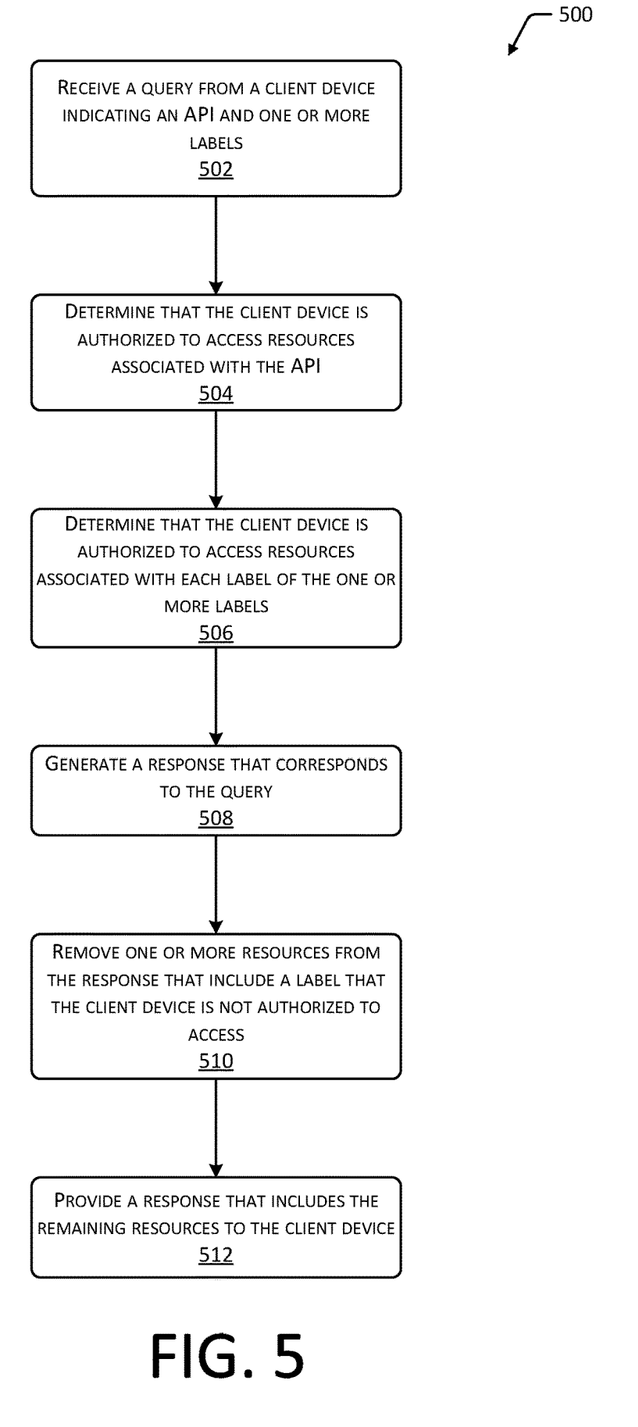
FIG. 5 is a flow diagram illustrating a method for determining authorization for a client device to access resources based on the labels associated with the resources.

FIG. 5 is a flow diagram 500 illustrating a method for determining authorization for a client device 408 to access resources 104 based on the labels 102 associated with the resources 104. At 502, a query 402 from a client device 408 may be received. The query 402 may indicate a particular API and one or more labels 102. For example, a query 402 may request access to all resources 104 associated with a "business orders" API that include the labels "A" and "B". In some implementations, the labels 102 may be indicated in the query 402 itself, such as via user input. In other implementations, the labels 102 may be determined based on session data associated with the client device 408. For example, based on one or more characteristics of the client device 408 or one or more interactions performed using the client device 408, one or more labels 102 may be associated with the current session executing on the client device 408. Subsequently, queries 402 provided by the client device 408 may be associated with the labels 102 indicated in the session data. Additionally, in some implementations, responses associated with the labels 102 indicated in the session data may be precomputed to enable responses 414 associated with a session to be provided promptly upon receipt of a query 402.

At 504, a determination may be made that the client device 408 is authorized to access resources 104 associated with the API indicated in the query 402. For example, security data may associate identifiers associated with client devices 408 with corresponding APIs for which access by the client device 408 is authorized. If the API indicated in the query 402 corresponds to the security data, the method may proceed to block 506. If the API indicated in the query 402 does not correspond to the security data, the query 402 may be rejected.

At 506, a determination may be made that the client device 408 is authorized to access resources 104 associated with each of the labels 102 indicated in the query 402. For example, the security data may indicate that the client device 408 is authorized to access resources 104 associated with the labels 102 "A" and "B". If the query 402 indicates the labels 102 "A", "B", or both "A" and "B", the method may proceed to 508. If the query 402 includes one or more labels 102 not indicated in the security data, the query 402 may be rejected.

At 508, a response 414 that corresponds to the query 402 may be generated. For example, after determining that the client device 408 is authorized to access the API and each label 102 indicated in the query 402, the query 402 may be provided to an API, a server 410, or other computing device associated with the resources 104 for generation of a response 414. In some implementations, the response 414 may include each resource 104 that corresponds to the query 402. In some cases, one or more of the resources 104 may include labels 102 other than the labels 102 indicated in the security data 102. For example, a resource 104 that includes the labels 102 "A", "B", and "C" would be responsive to query 402 that indicates the labels 102 "A" and "B".

In such a case, at 510, one or more resources 104 that include a label 102 that the client device 408 is not authorized to access may be removed from the response 414. For example, if the client device 102 is not authorized to access the label 102 "C", resources 104 that include the labels 102 "A", "B", and "C" may be removed from the response 414, while resources 104 that include only the labels 102 "A" and "B" may be included. At 512, a response 414 that includes the remaining resources 104 may be provided to the client device 408.

Figure 6:
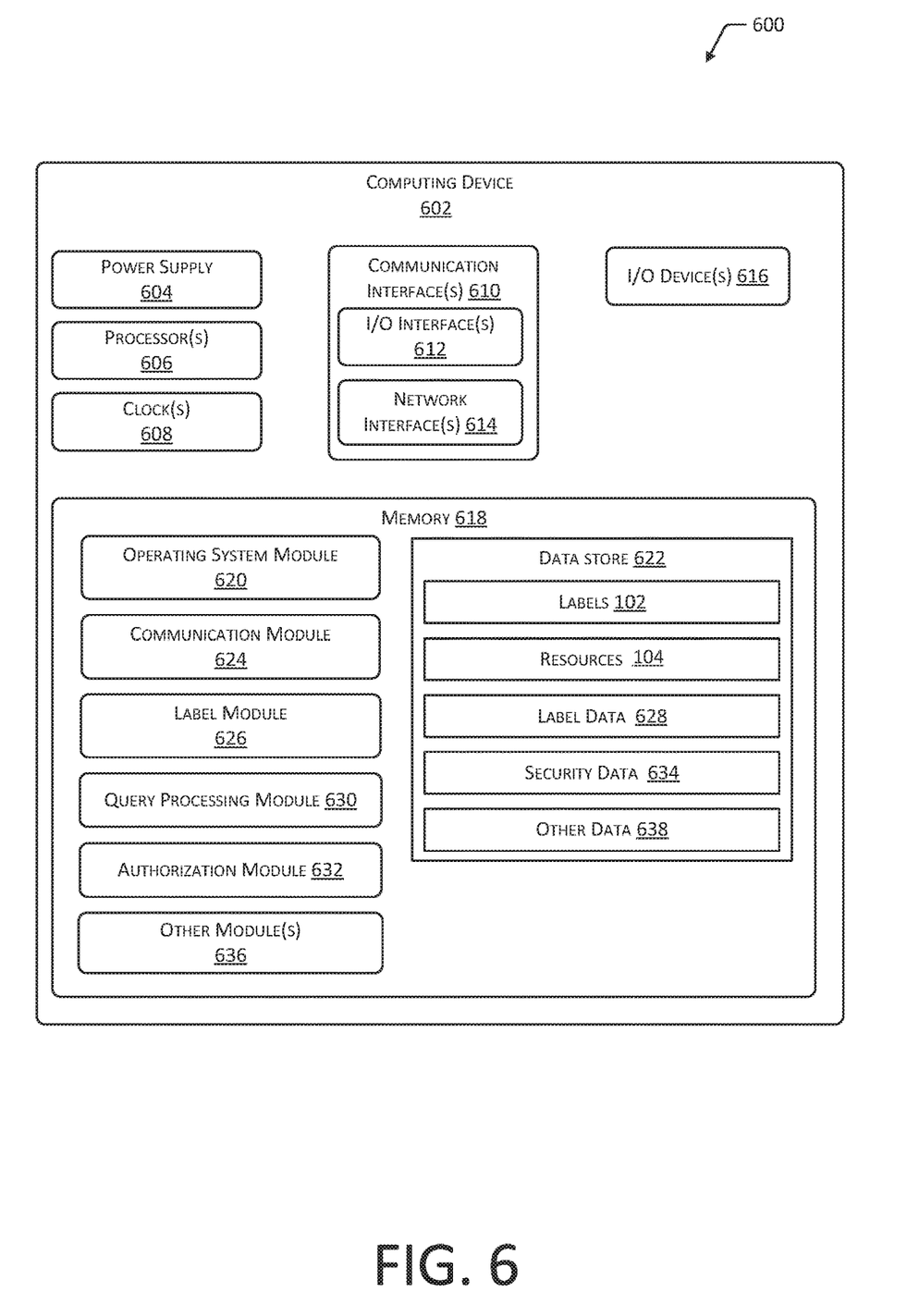
FIG. 6 is a block diagram depicting a computing device within the present disclosure.

FIG. 6 is a block diagram 600 depicting a computing device 602 within the present disclosure. The computing device 602 may include the client device 408, the server 410, or one or more other computing devices 602 in communication with the client device 408 or server 410. While FIG. 5 depicts a single block diagram 600 representative of a computing device 602, any number of networked computing devices 602 may perform the implementations described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device or output device associated with the computing device 602. For example, I/O devices 616 may include touch sensors, keyboards, mouse devices, microphones, image sensors (e.g., cameras), scanners, displays, speakers, haptic devices, printers, and so forth. In some implementations, the I/O devices 616 may be physically incorporated with the computing device 602 or may be externally placed.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

The communication module 624 may be configured to establish communications with one or more other computing devices 602, such as to receive and transmit queries 402, responses 414, resources 104, and other types of data between computing devices 602. Communications may be authenticated, encrypted, and so forth.

The memory 618 may store a label module 626 that may be used to associate labels 102 with one or more resources 104. For example, the label module 626 may access label data 628 indicative of one or more rules to control the manner in which labels 102 are associated with resources 104. Continuing the example, the label data 628 may indicate particular categories 202, particular content types, particular values, and so forth, each of which may correspond to one or more labels 102. The label module 626 may associate labels 102 with resources 104 based on the characteristics of the resources 104.

The memory 618 may also include a query processing module 630. The query processing module 630 may receive a query 402 indicative of one or more labels 102, determine correspondence between the query 402 and the labels 102 associated with the resources 104, and generate a response 414 indicative of one or more of the resources 104. In some implementations, queries 402 may include other characteristics of resources 104 in addition to labels 102, such as categories 202, data types, values, and so forth. The query processing module 630 may determine correspondence between the other characteristics and the resources 104 when generating the response 414. In some implementations, the query processing module 630 may further be configured to precompute one or more responses 414 based on session data or previously received queries 402 from a computing device 602. For example, if a current session associated with a computing device 602 indicates pervious queries 402 for resources 104 associated with a particular combination of labels 102, the query processing module 630 may precompute a response 414 indicative of the resources 104 that correspond to the combination of labels 102.

The memory 618 may further include an authorization module 632. The authorization module 632 may be configured to determine whether a computing device 602 providing a query 402 is authorized to receive the resources 104 that correspond to the response 414. For example, the authorization module 632 may access security data 634, which may indicate particular APIs and API resources 104 that may be accessed by particular computing devices 602, as well as particular labels 102 for which access by a particular computing device 602 is authorized or prohibited. For example, the security data 634 may indicate that a particular computing device 602 is authorized to access resources 104 that include the labels 102 "A", "B", and "C". A query 402 provided by the computing device 602 may request access to resources 104 that include the labels 102 "A" and "B". A response 414 to the query 402 may include a first resource 102 having the labels "A" and "B", a second resource 104 having the labels 102 "A", "B", and "C", and a third resource 104 having the labels 102 "A", "B", and "D". Because the computing device 602 is authorized to access resources 104 having the labels 102 "A", "B", and "C", the first and second resources 104 may be included in the response 414. However, because the computing device 602 is not authorized to access resources 104 having the label 102 "D", the third resource 104 may not be included in the response 414.

Other modules 636 may also be present in the memory 618. For example, encryption modules may be used to encrypt and decrypt communications between computing devices 602. Authentication modules may be used to authenticate communications sent or received by computing devices 602. Other modules 636 may further include a user interface module, which may provide a user interface for receiving or modifying resources 104, label data 628, security data 634, or configurations associated with the computing device 602.

Other data 638 within the data store(s) 622 may include user input data, such as configurations and settings associated with computing devices 602. Other data 638 may include encryption keys and schema, access credentials, and so forth. Other data 638 may also include default rules or other label data 628 or other default values and configurations for the computing device 602.

In different implementations, different computing devices 602 may have different capabilities or capacities. For example, servers 410 may have greater processing capabilities or data storage capacity than client devices 408.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
access a plurality of resources associated with one or more application programming interfaces (API), wherein at least a subset of the plurality of resources includes a data object having a type, a relationship to at least one other resource, and one or more methods to operate on the data object, and wherein the plurality of resources includes at least a first resource associated with a first category, a second resource associated with a second category, and a third resource associated with a third category;
based on the first resource being associated with the first category, associate a first label with the first resource, wherein the first label is indicative of the first category;
based on the second resource being associated with the second category, associate a second label with the second resource, wherein the second label is indicative of the second category;
determine that the first resource includes a link that references the third resource;
access label data indicating that links associated with the first category are to cause resources to be associated with the first label;
based on the label data indicating that links associated with the first category are to cause resources to be associated with the first label and based on the first resource including the link that references the third resource, associate the first label with the third resource;
determine at least a portion of content associated with the third resource to include a content type;
based on the at least a portion of the content including the content type, associate a third label with the third resource, wherein the third label is indicative of the content type, such that the third resource is associated with the first label and the third label;
receive, from a client device, a query indicative of the first label and the third label;
determine that the third resource is associated with the first label and the third label; and
based on the third resource being associated with the first label and the third label, provide access to the third resource to the client device in response to the query indicative of the first label and the third label.

2. The system of claim 1, further comprising computer-executable instructions to:
determine session data associated with the client device, wherein the session data includes an identifier associated with the client device and is indicative of the query associated with the first label and the third label; and
determine, based on the session data, that access by the client device to an API associated with resources associated with the third label is authorized, wherein access to the third resource is provided to the client device in response to the session data and the third label.

3. The system of claim 1, further comprising computer-executable instructions to:
determine session data associated with the client device, wherein the session data includes an identifier and is indicative of the first label and the third label;
in response to the session data indicating the first label and the third label, determine a fourth resource associated with the first label and the third label;
based on the fourth resource being associated with the first label and the third label, precompute a function associated with access to the fourth resource to form precomputed data;
receive, from the client device, a request indicative of the fourth resource; and
in response to the request, provide the precomputed data to the client device.

4. The system of claim 1, further comprising computer-executable instructions to:
determine at least a portion of the plurality of resources that is associated with the first label and the third label;
aggregate the at least a portion of the plurality of resources in a fourth category; and
in response to the query, provide access to the at least a portion of the plurality of resources associated with the fourth category.

5. A method comprising:
accessing a plurality of resources that includes at least a first resource associated with a first category and a second resource associated with a second category;
determining a content type associated with at least a portion of the first resource and at least a portion of the second resource;
determining that the first resource is associated with a first characteristic, wherein the first characteristic includes one or more of: the first category of the first resource, a first link from a third resource that references the first resource, or the content type associated with the at least a portion of the first resource;
associating a first label with the first resource based on the first characteristic of the first resource;
determining that the first resource associated with the first label is further associated with a second characteristic, wherein the second characteristic includes the one or more of the first category, the first link, or the content type, and the second characteristic differs from the first characteristic;
associating a second label with the first resource based on the second characteristic of the first resource;
determining that the second resource is associated with the second characteristic;
associating the second label with the second resource based on the second characteristic of the second resource;
receiving, from a client device, a query indicating the first label and the second label;
determining correspondence between the query and the first resource; and
based on the correspondence, providing a response indicative of at least the first resource to the client device.

6. The method of claim 5, wherein the first label is indicative of the first category, the method further comprising:
determining that one or more of the first resource or a fourth resource associated with the first category includes a second link to the second resource;
in response to the second link referencing the second resource, associating the first label with the second resource;
determining correspondence between the query and the second resource; and based on the correspondence, including an indication of the second resource in the response.

7. The method of claim 6, further comprising:
determining a fifth resource of the plurality of resources, wherein the fifth resource is associated with a third category;
associating a third label with the fifth resource;
determining that the fifth resource includes a third link to the second resource; and
in response to the third link referencing the second resource, associating the third label with the second resource.

8. The method of claim 7, wherein at least a subset of the plurality of resources includes resources associated with an application programming interface (API) of a representational state transfer (REST) architecture, and the second link and the third link include hypermedia as the engine of application state (HATEOAS) links.

9. The method of claim 5, further comprising:
determining that access, by the client device, to resources associated with the second label is authorized, wherein the response is automatically provided to the client device based on association of the second label with the first resource.

10. The method of claim 5, further comprising:
determining session data associated with the client device, wherein the session data is indicative of the first label and the second label;
determining at least a subset of the plurality of resources that includes the first resource, wherein the at least a subset of the plurality of resources is associated with the first label and the second label; and
precomputing at least a portion of the response based on the at least a subset of the plurality of resources to form precomputed data, wherein the response includes the precomputed data.

11. The method of claim 5, further comprising:
determining at least a subset of the plurality of resources that is associated with the first label and the second label;
generating a fourth resource that references the at least a subset of the plurality of resources; and
including an indication of the fourth resource in the response.

12. The method of claim 5, further comprising:
determining a field in the first resource that is associated with one or more of the first label or the second label; and
based on correspondence between the field and the first label and the second label associated with the first resource, performing a function associated with the field.

13. A system comprising:
one or more memories storing computer-executable instructions; and one or more hardware processors to execute the computer-executable instructions to:
access a plurality of resources that includes at least a first resource associated with a first category and a second resource associated with a second category;
determine that the first resource is associated with a first characteristic, wherein the first characteristic includes one or more of: the first category of the first resource, a first link from a third resource that references the first resource, or a first content type associated with at least a portion of the first resource;
associate a first label indicative of the first characteristic with the first resource;
determine that the first resource includes a first reference that indicates the second resource;
in response to the first resource including the first reference, associate the first label with the second resource;
determine that the second resource is associated with a second characteristic, wherein the second characteristic includes one or more of: the second category of the second resource, a second link that references the second resource, or a second content type associated with at least a portion of the second resource;
associate a second label indicative of the second characteristic with the second resource;
receive, from a client device, a query indicating the first label and the second label;
determine that the second resource is associated with the first label and the second label; and
based on the second resource being associated with the first label and the second label, provide a response indicative of access to at least the second resource to the client device.

14. The system of claim 13, further comprising computer-executable instructions to:
determine a third resource of the plurality of resources is associated with a third category;
associate a third label indicative of the third category with the third resource;
determine that the third resource includes a second reference to the second resource; and
in response to the second reference, associate the third label with the second resource.

15. The system of claim 14, wherein the first resource, the second resource, and the third resource are associated with performance of one or more functions by one or more application programming interfaces (API), and the first reference and the second reference include hypermedia as the engine of application state (HATEOAS) links that indicate the second resource.

16. The system of claim 13, further comprising computer-executable instructions to:
determine that access by the client device to resources associated with one or more of the first label or the second label is authorized, wherein the response is provided to the client device based on association of the one or more of the first label or the second label with the second resource.

17. The system of claim 13, further comprising computer-executable instructions to:
in response to the query indicating the first label and the second label, determine a third resource associated with the first label and the second label;
generate precomputed data based on the third resource;
receive a request from the client device indicative of the third resource; and
provide the precomputed data to the client device.

18. The system of claim 13, further comprising computer-executable instructions to:
determine at least a subset of the plurality of resources that is associated with the first label and the second label; and
generate a third resource that includes a plurality of references, wherein each reference of the plurality of references indicates a respective resource of the at least a subset of the plurality of resources.

19. The system of claim 13, further comprising computer-executable instructions to:
- determine a portion of the second resource associated with one or more of the first label or the second label; and
- in response to the one or more of the first label or the second label being associated with the portion of the second resource, perform a function to generate data associated with the portion of the second resource.

20. The system of claim 13, further comprising computer-executable instructions to:
- receive the query from the client device prior to associating one or more of the first label or the second label with the second resource; and
- in response to the query, determine one or more of the first reference or the second characteristic and associate the one or more of the first label or the second label with the second resource.

* * * * *